United States Patent [19]

Walter

[11] 3,841,766

[45] Oct. 15, 1974

[54] LIGHT CURTAIN FOR ACCIDENT PREVENTION

[76] Inventor: Arthur Walter, Hindenburgstrabe 32, Denzlingen, Germany

[22] Filed: June 27, 1973

[21] Appl. No.: 374,004

[30] Foreign Application Priority Data
July 25, 1972 Germany............................ 2236482

[52] U.S. Cl.................. 356/256, 356/167, 350/285, 250/235
[51] Int. Cl............................................. G02f 1/34
[58] Field of Search ............ 356/167, 256; 350/285, 350/266, 234, 235, 236, 221

[56] References Cited
UNITED STATES PATENTS 3,360,654  12/1961  Muller ............................ 250/236 X
3,619,630  11/1971  McLeod .......................... 250/236 X

*Primary Examiner*—John K. Corbin
*Assistant Examiner*—Paul K. Godwin

[57] ABSTRACT

Light curtain apparatus for accident prevention comprising: a pair of scanners disposed opposite one another, each scanning a respective predetermined area around an axis located in the scanner with a beam of light and each being associated with a respective one of a pair of opposed reflectors such that each beam of light is reflected back on itself independently of the angle of incidence; each scanner having installed therein a photoelectric transducer which, in the absence of any obstacle in the path of the associated beam of light, receives the light returned by the reflector and converts it into an electrical signal, any interruption in the electrical signal serving as an indication of an obstacle present in the beam of light; the two scanning areas each being in the form of a right-angled triangle and said triangles being contiguous.

10 Claims, 3 Drawing Figures

PATENTED OCT 15 1974 3,841,766

LIGHT CURTAIN FOR ACCIDENT PREVENTION

The invention relates to a light curtain for accident prevention having at least one scanner scanning a predetermined surface area with a beam of light, a reflector opposite this scanner which reflects the light beam back on itself, independently of the angle of incidence, and a photoelectric transducer built into the scanner which, when there is no obstacle in the beam path, receives the light reflected by the reflector and converts it into an electrical signal, any interruption in the electrical signal being utilized as an indication of some obstacle situated in the path of the beam.

With the known accident prevention light curtains of this type the scanning beam of light is moved up and down continuously in a substantially rectangular scanning area by means of a mirror scanning wheel and a concave mirror extending over the entire height of the scanning area. Scanning of the rectangular area takes place periodically, for example some hundred times per second.

The advantage of the known accident prevention light curtain consists in the fact that an area which is in general elongated and rectangular is scanned and swept completely, that is to say into the farthest corner thus giving a good degree of certainty that an obstacle in the curtain will be detected. A disadvantage with the known curtain, however, is that the scanning unit has to extend over the entire height of the scanning area.

The main object of the invention is therefore to provide an accident prevention light curtain of the type described above in which the scanner can be of compact construction and in particular has a very small constructional height.

To attain this object the invention provides that two scanners, and two respectively associated reflectors, are disposed opposite one another, each scanning unit emitting a light beam which scans round an axis situated in that unit, while the two scanning areas, which each have the shape of a sector of a circle, border on one another. Thus, according to the invention, scanning units are employed in which the rotational axis of the light beam lies in the unit itself and so a compact construction can be used for producing the scanning light beam. By use of two scanning units of the same type disposed opposite one another a substantially rectangular scanning area is also obtained as required.

The light curtain according to the invention can be produced very economically, allows very large ranges and is characterised by high operational reliability. The curtain is also suitable for the monitoring of large areas, of the order of 20 m × 100 m for example. A particularly advantageous application is found in the case of high rack storage, where projecting parts can be detected by means of the light curtain according to the invention.

In accordance with a preferred form of construction it is provided that the reflectors are disposed parallel to one another and the scanning units are disposed in an offset relationship to one another, each at the end of the reflector associated with the other scanning unit.

The scanning motions of the two units are conveniently co-ordinated with one another in such a way that one unit starts scanning at the common boundary line between the two areas and continues outwardly and the other unit starts scanning at the outside and continues inwardly towards the common boundary. In this connection the rotary motion of the light beam coming from the second unit conveniently coincides with the rotary motion of the light beam coming from the first unit. With this form of construction it is possible to manage with one common electronic evaluating unit for both scanners, that is to say for the whole of the accident prevention light curtain. It is also convenient to generate a starting and finishing signal within each scanning unit. For reception, a further photo-electric transducer is fitted in each scanner for example, being so designed and orientated that it receives the rotary beam of the opposite scanning unit in its initial or final position. Thus according to the invention the start and the finish of light incidence on the photoelectric transducers effecting the monitoring are marked. At the same time the additional photoelectric transducers monitor the light intensity of the rotarybeam, which is of great advantage for the operational reliability of the installation. The electronic circuit is designed so that the evaluating circuit signals danger even when there is some defect which has arisen in the unit itself.

It is convenient if each scanning area is in the form of a right-angled triangle so that the overall result is a rectangular scanning field.

However, with the arrangement according to the invention there may also, advantageously, be deviations from the pure rectangular shape, something which is not possible in the case of the known accident prevention light curtain.

In order to monitor large areas with a very fine pencil of light, lasers are employed with advantage as light sources in the scanning units.

In a further preferred form of construction the scanning units operate with chopped light and the individual light pulses can be compared with a time standard which is scanned simultaneously. In this way an obstacle which is brought into the curtain can be localised.

The photoelectric transducers for generating the starting and ending marks are preferably constructed in such a way that they do not require adjustment for all the possible distance-height ratios.

For the reflectors it is convenient to use triple reflectors which, with a rectangular scanning field allow scanning angles of preferably up to 22°, thus giving a distance aspect ratio of 10 : 4.

In order to obtain still higher scanning fields with an aspect ratio up to 1 : 1, the reflectors may consist of individual parts which are inclined increasingly according to the changing angle of incidence of the rotary beam.

The invention will now be further described by way of illustration with reference to the accompanying drawing in which the Figures are as follows.

Figure 1:
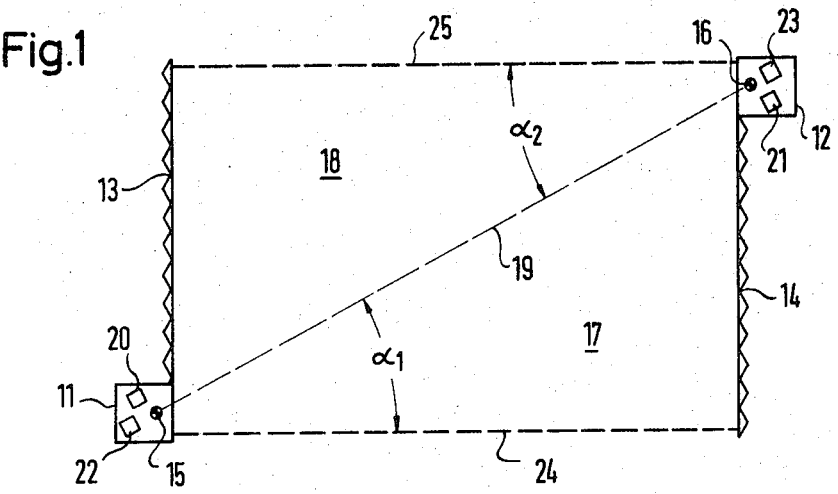
FIG. 1 is a diagrammatic side view of an accident prevention light curtain according to the invention.

As can be seen from FIG. 1, scanning units 11, 12 are disposed at the ends of the diagonal 19 of a rectangle 13-24-14-25, each of which units transmits a light beam which can swing round an axis 15 or 16 which is perpendicular to the plane of the drawing. The light beam transmitted by the scanning unit 11 sweeps an angle $\alpha_1$ and the rotary beam transmitted by the scanning unit 12 sweeps an angle $\alpha_2$.

Triple reflectors 13, 14 are disposed parallel to one another opposite each scanning unit. The light beams from the scanning units 11, 12, together with the reflectors 13, 14 determine scanning areas 17 or 18 in the form of rectangular triangles which, according to the invention, are so placed that their hypotenuses coincide at 19 and a rectangular scanning field is formed, the long sides of which are marked 24 or 25 respectively and the narrow sides of which are occupied by the reflectors 13, 14.

Disposed in the scanning units 11, 12 are first and second photoelectric transducers 20, 21 which convert into an electric signal the light which is reflected back on the autocollimation principle. Also disposed in the scanning units 11, 12 are third and fourth photoelectric transducers 22, 23 which receive light from the opposite unit only when it is transmitted along the diagonal 19.

The manner of operation of the light curtain shown in FIG. 1 is explained below with reference to FIG. 2.

First the rotary beam from the scanning unit 11 starts its scanning movement along the diagonal 19. At this moment the photoelectric transducer 23 in the scanning unit 12 receives a light pulse which marks the start of the scanning. In addition a further pulse is released inside the scanning unit 11 as a mark of the start.

Figure 2:
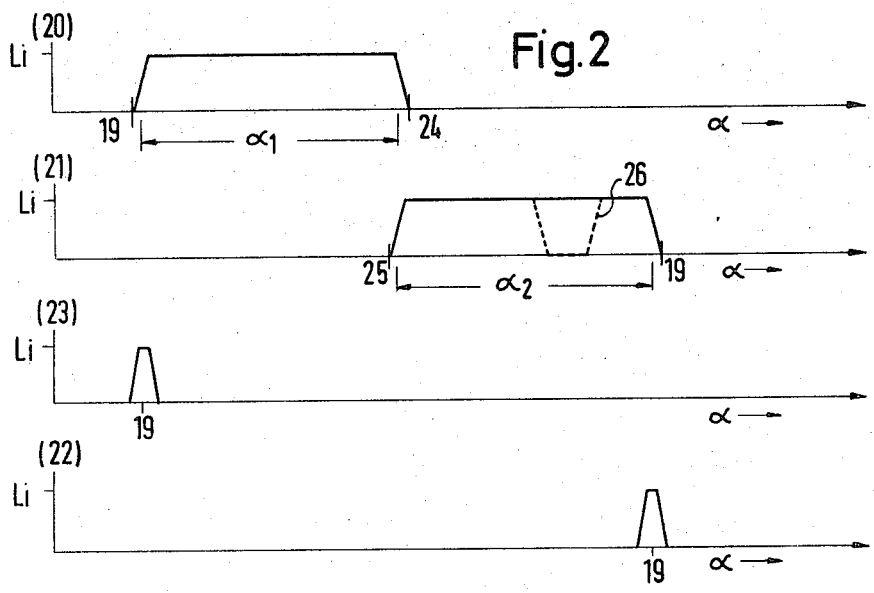
FIG. 2 shows four pulse diagrams to illustrate the manner of operation of the apparatus shown in FIG. 1.

In the course of further scanning over the angle $\alpha_1$ from the diagonal 19 to the side 24 the transducer 21 receives light as indicated by the first diagram in FIG. 2. As soon as the line 24 is reached the unit 11 stops scanning, whereas the scanning unit 12 continues the scanning along the line 25 and finally ends the scanning when the diagonal 19 is reached. At the same moment, as shown in the fourth diagram in FIG. 2, the transducer 22 receives a light pulse which marks the end of a scanning cycle.

The starting pulse is indicated in the third diagram in FIG. 2.

The break in the pulse voltage in the second diagram, indicated by the broken line 26, shows that at the angle of rotation in question there was an obstacle in the scanning area. When the position of the break 26 is known it is also possible to give, in angular measurement, the location of the obstacle within the light curtain.

Figure 3:
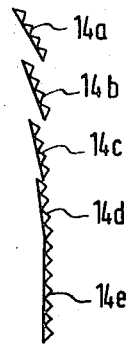
FIG. 3 is a preferred reflector arrangement for obtaining large scanning fields.

FIG. 3 shows a reflector consisting of individual parts 14a, b, c, d, e which are inclined to an increasing degree from the bottom of the series upwards so that even with large angles of incidence a perfect reflection of the incident light beam back on itself is still ensured.

All the individual parts lie in the same plane, however. The width of the scanning field 17, 18 can be substantially increased by this measure.

What I claim is:

1. Light curtain apparatus for accident prevention comprising: a pair of scanners disposed opposite one another, each scanning a respective predetermined area around an axis located in the scanner with a beam of light and each being associated with a respective one of a pair of opposed reflectors such that each beam of light is reflected back on itself independently of the angle of incidence; each scanner having installed therein a photoelectric transducer which, in the absence of any obstacle in the path of the associated beam of light, receives the light returned by the reflector and converts it into an electrical signal, any interruption in the electrical signal serving as an indication of an obstacle present in the beam of light; the two scanning areas each being in the form of a right-angled triangle and said triangles being contiguous.

2. Apparatus according to claim 1, wherein the respective reflectors are parallel with one another and the scanners are offset relative to one another, each being located at the end of the reflector associated with the other scanner.

3. Apparatus according to claim 1, wherein the scanning movements of the two scanners are co-ordinated with one another in such a way that one scanner begins scanning at the common boundary line between the two areas and continues in an outward direction and the other scanner starts scanning at the outside and continues in a direction towards said boundary.

4. Apparatus according to claim 3, wherein the rotary movement of the light beam coming from the second scanner coincides in time with rotary movement of the light beam coming from the first scanner.

5. Apparatus according to claim 4, wherein in each scanner there is a further photoelectric transducer which is so designed and orientated that it receives the beam from the opposite scanner in its starting and finishing position.

6. Apparatus according to claim 5, wherein a starting and finishing signal is generated in each scanner by said further photoelectric transducer.

7. Apparatus according to claim 1, wherein lasers are employed as light sources in the scanners.

8. Apparatus according to claim 1, wherein said reflectors are triple reflectors.

9. Apparatus according to claim 8, wherein the two scanning areas comprise a rectangular scanning field and the triple reflectors permit scanning angles up to 22°, giving a distance aspect ratio of 10:4.

10. Apparatus according to claim 1, wherein the reflectors consist of individual parts which are inclined to an increasing degree to meet the changing angle of incidence of the rotary beam.

* * * * *